United States Patent [19]

O'Roark et al.

[11] 4,309,449

[45] Jan. 5, 1982

[54] METHOD FOR PRESERVING LIVE HARD-SHELL CRABS BY FREEZING

[76] Inventors: Wayne O'Roark, 8208 Grubb Rd.; Csaba Magassy, 5454 Wisconsin Ave., both of Chevy Chase, Md. 20015

[21] Appl. No.: 141,938

[22] Filed: Apr. 21, 1980

[51] Int. Cl.³ .................. A22C 29/02; A23B 4/08; A23B 4/10; A23L 1/33
[52] U.S. Cl. .................................. 426/68; 62/64; 426/308; 426/310; 426/506; 426/524; 426/643; 426/652
[58] Field of Search ............... 426/68, 302, 310, 643, 426/652, 506, 519, 524, 308, 132; 62/62, 64, 68, 373, 376

[56] References Cited

U.S. PATENT DOCUMENTS

| | | | |
|---|---|---|---|
| 709,751 | 9/1902 | Davis | 426/506 X |
| 889,238 | 6/1908 | Jensen | 426/132 X |
| 1,322,312 | 11/1919 | Larsen . | |
| 1,388,298 | 8/1921 | Petersen | 426/305 X |
| 1,969,832 | 9/1935 | Beard | 426/524 X |
| 2,009,546 | 7/1935 | Fannen et al. | 426/132 X |
| 2,093,069 | 9/1937 | Bedford | 426/643 X |
| 2,145,393 | 1/1939 | Hergert | 426/310 X |
| 2,151,967 | 3/1939 | Hedreen et al. . | |
| 2,175,680 | 10/1939 | Bedford . | |
| 2,194,684 | 3/1940 | Bedford . | |
| 2,214,398 | 9/1940 | Bedford . | |
| 2,616,811 | 11/1952 | Kjorstad | 426/643 X |
| 2,909,040 | 10/1959 | Newell | 426/524 X |
| 2,982,109 | 5/1961 | Puretic | 62/64 |
| 3,022,175 | 2/1962 | Wakefield | 426/308 |
| 4,051,690 | 10/1977 | Doust | 62/64 |

FOREIGN PATENT DOCUMENTS 388353  5/1931  United Kingdom ............... 426/524

OTHER PUBLICATIONS

Wright, "Frozen Assets; Rockville Crab-Processing Firm has a Better Idea," The Washington Business Section of the Washington Post, 4-14-80, p. 9.
Tench, "Freezing Crab Afloat", Food Manufacture, 12-1961, pp. 517-519; 426-524.
Ampola et al., "A New Approach to the Freezing Preservation of Blue Crab," National Maine Fisheries Service, pp. 243-248; 426-524.
Plumline et al., "Freon Freezing of Live Blue Crab," Freon Products Laboratory, E.I. Dupont Technical Report KSS-7772, 1-31-75; 426-524.
Strasser, "Blue Crab Meat Preservation by Freezing," Annual Meeting of Institute of Food Technologists, 5-1970, pp. 1-13; 426-524.

*Primary Examiner*—Arthur L. Corbin
*Attorney, Agent, or Firm*—Fleit & Jacobson

[57] ABSTRACT

A method for preserving live hard-shell crabs by immersion in a constantly agitated brine solution to freeze the crabs. The brine solution contains a chemical defoamer and is maintained at a temperature of from about −7° to 10° F. to rapidly freeze the crabs, the time of immersion being preferably from about 30 to 50 minutes.

6 Claims, 1 Drawing Figure

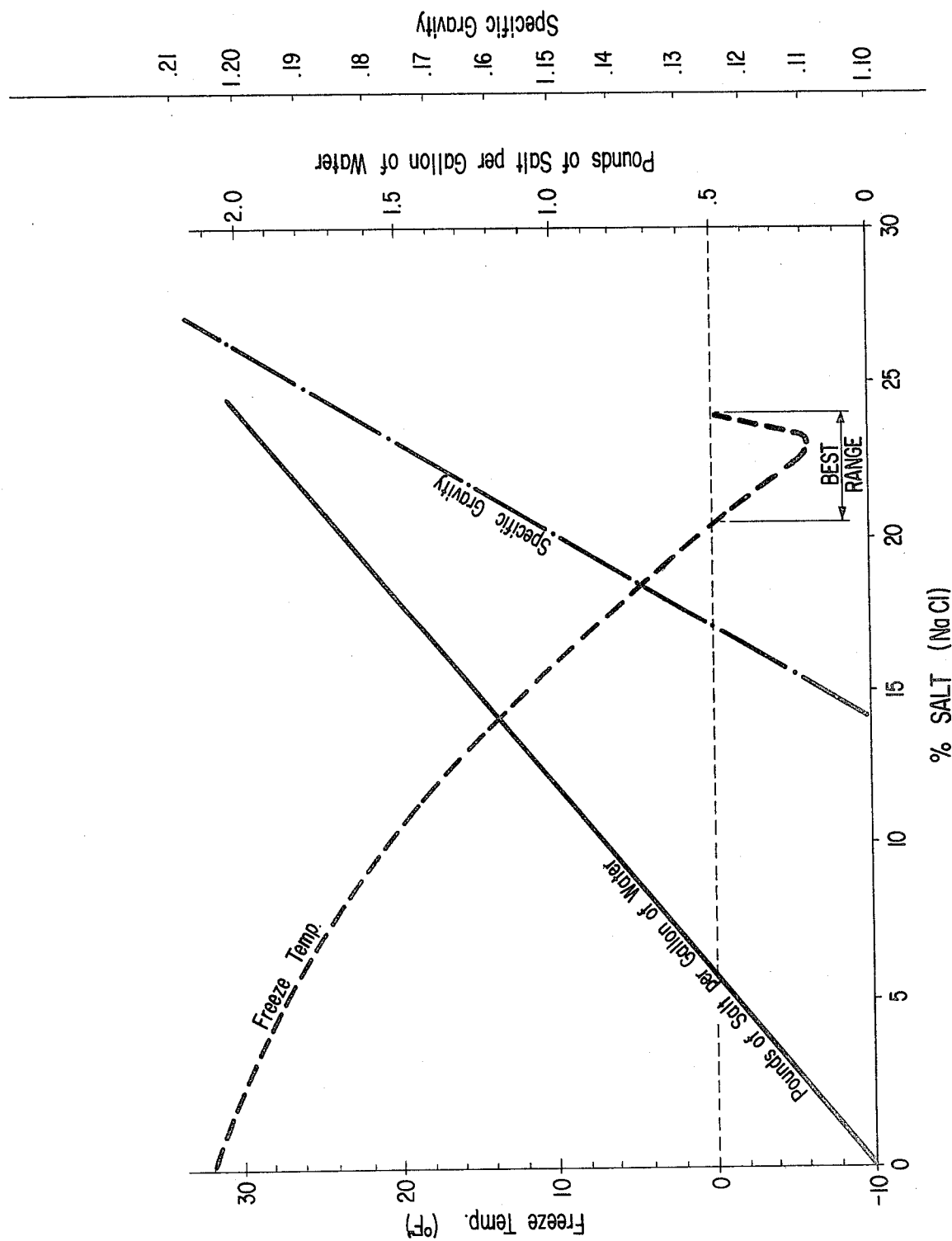

METHOD FOR PRESERVING LIVE HARD-SHELL CRABS BY FREEZING

BACKGROUND OF THE INVENTION

1. Field of the Invention

The present application relates to a method for preserving hard-shelled crabs by freezing.

2. Background of the Invention

Crab is the popular name for any decapod crustacean of the suborder Brachyura. A crab's body is covered with a hard shell or carapace. During a crab's life, it periodically casts both its shell and skin and grows a completely new integument by a molting process.

The larger-sized variety of crabs are often used for food, the most common food crab of the U.S. being the blue crab, Callinectes sapidus, which is found on both the Atlantic and Gulf coasts. The expressions hard-shelled crabs and soft-shelled crabs are commonly employed, but do not apply to a particular species. Rather, these expressions refer to a specific portion of a crab's life cycle. For example, blue crabs are called soft-shelled when they have recently molted and hard-shelled when the shell is fully formed.

In the past, it was believed impossible to freeze hard-shelled crabs. Previous attempts to freeze hard-shelled crabs have been unsuccessful for a number of reasons. First, crab meat begins to deteriorate or decompose almost immediately upon the death of the crab. By contrast, lobster, which also has a shell but which is not as susceptible to deterioration as the hard-shelled crab, can be successfully frozen. Second, the hard-shelled crab has a rather thick shell which acts as an insulator and which, therefore, increases the time necessary for freezing the crab. Consequently, prior attempts to freeze hard-shelled crabs have resulted in crab meat having an undesirable taste and texture.

It is, therefore, an object of the present invention to provide a method by which live hard-shelled crabs can be preserved by freezing and when later steamed are comparable in taste and texture to live steamed crabs.

It is yet another object of the present invention to provide a method of preserving hard-shelled crabs by freezing which permits these crabs to be stored for extended periods of time and yet retain the characteristics of fresh crabs.

Further objects and advantages of the present invention will become apparent upon reading the undergoing specification and claims.

SUMMARY OF THE INVENTION

First, live hard-shelled crabs are culled to remove the dead and those which are too small for consumption. The crabs are then washed and placed in a refrigeration unit to be chilled. The refrigeration unit is maintained at a temperature of from about 33° to 47° F., preferably at 38° F. Each pincer claw and the point of the carapace are preferably bound to hold them tight, thus minimizing fracture during and after freezing. The crabs are placed in a mesh basket or similar retaining means and immersed into a brine solution, which is maintained at a temperature of from about −7° to +10° F. The brine solution is typically a stabilized solution of sodium chloride. Importantly, the brine solution is continuously agitated to create a constant flow of solution over, around and through the crabs to promote their rapid freezing. The brine solution may also contain a defoamer to prevent or inhibit the foaming action due to the oils released by the crabs. Finally, upon removal from the brine solution, the crabs may be dipped in cold water at a temperature of about 30° to 33° F., typically for a few seconds, to provide a thin coating of ice on each crab, which aids in the prevention of dehydration during storage and breakage during shipping. The present method, therefore, constitutes a significant advance in the food preservation art, since it has long been considered impossible to freeze live hard-shelled crabs, although fish and other comestibles have heretofore been frozen by immersion in a brine solution.

BRIEF DESCRIPTION OF THE DRAWING

The sole FIGURE is a graph showing the relationship between sodium chloride concentration and freeze temperature in accordance with the present invention.

DESCRIPTION OF THE PREFERRED EMBODIMENTS

Typically, live hard-shelled crabs are purchased either from the crabber or a middleman. As is standard practice, the crabs are then culled to remove the dead and those which are too small for consumption, washed, and chilled to a temperature of from about 33° to 47° F., generally by placement in a refrigeration unit. At this stage, in accordance with the present invention, it is preferable to place an elastic band, or any similar immobilizing means, over each pincer claw and the point of the carapace to hold them tight. This procedure is not essential, but serves to minimize fracture during freezing and transportation. The crabs are now ready to be frozen.

According to the present invention, the crabs are frozen by immersion in a brine solution, a supersaturated solution of NaCl. The specific gravity of the solution should be maintained preferably from about 1.10 to 1.14, and most preferably at about 1.12, corresponding respectively to concentrations of from 21 to 24%, and about 23.5% sodium chloride by weight. The sodium chloride concentration must be controlled as described to prevent slush from forming in the lower temperature ranges. Since ordinary sea water freezes at too high a temperature, salt is added to lower the freezing temperature of the solution.

The stabilized brine solution is prepared by first dissolving a proper amount of salt at a higher temperature and then lowering the solution temperature to the desired freezing temperature. Care must be taken in lowering the temperature, since too low a temperature will result in slushing and salt precipitation. The formation of slush is detrimental, since it interferes with the free circulation of the brine solution. Further, salt precipitation indicates a breakdown in the stability of the brine solution. Once precipitation occurs, the concentration of salt decreases, and the system must be recharged by raising its temperature, allowing the salt to redissolve.

The brine solution, therefore, should be maintained at a temperature of from about −7° to +10° F., preferably from about −7° to 0° F. and most preferably at 0° F. As noted above, the freeze temperature and salt concentration are interdependent. The relationship between these factors and the best operating conditions are shown graphically in the FIGURE.

The brine solution is continuously agitated in accordance with the present invention. This agitation is essential and must be conducted to create a constant flow of brine solution over, around and through the crabs.

The constant flow of brine solution serves to remove the boundary layer of heat from around the crab and permits the rapid freezing of the crab by providing a continuous maximum temperature differential between the brine solution and the crab. Due in part to the insulating nature of the crab's shell, this agitation is essential, since without the constant flow of solution produced thereby, the crab would not freeze rapidly enough to prevent deterioration. The brine solution, of course, may be agitated by any conventional means including but not limited to stirring, propeller agitation, or vibration, including ultrasound.

Sometimes in conducting the method according to the present invention, as a result of the agitation, foam is formed in the brine solution due to the natural oils present in the crabs. The foam tends to be attracted to the crab, surrounding it and acting as an insulator. Thus, the formation of foam in the brine solution serves to impair the effective heat transfer from the crab to the brine solution and may prevent attainment of the requisite rapid freezing. The foam also causes precipitation of the salt. To solve these problems, a defoamer, which prevents the foaming action due to the oils from the crab, may be added to the brine solution. Although any of the well known defoamers may be employed, silicone based or vegetable based defoamers are preferred, since they are FDA approved for foodstuffs. Most preferred is the defoamer sold under the trademark Shield Brite Defoamer by Pacific Chemical which consists of dimethylpolysiloxane stearate emulsifiers, xanthan gum stabilizers, water and methylparaben. The concentration of the defoamer is typically from about 300 to 400 ppm and preferably about 400 ppm.

The crabs, prepared as discussed above, are then immersed into the brine solution. It is important in placing the crabs in the brine solution that the solution be able to constantly flow over, around and through the crabs to remove the boundary layer of heat and permit rapid freezing. Thus, the crabs may simply be immersed in the solution. Preferably, however, the crabs are placed in a mesh basket, or similar means, so as not to hinder the constant flow resulting from the agitation. Of course, other means for maintaining a constant flow of brine solution over, around and through the crabs immersed in the brine solution will suggest themselves to one of ordinary skill in the art, the important factor being maintenance of this constant flow.

The packing density of the crabs being frozen is not really critical, providing they are not so tightly packed as to impede the flow of brine around each individual crab. Of course, a looser packing will provide a more efficient freezing operation, but for practical reasons about four dozen crabs are typically placed in a standard mesh basket.

Once immersed in the brine solution, the crabs are maintained therein until frozen. The duration of the freezing period is a function of the brine solution temperature, the degree of solution agitation, the size of the individual crabs, the total weight of the crabs and the volume of the brine solution. Typically, the crabs are maintained in the solution for from about 20 to 60 minutes. The crabs are preferably maintained in the solution from about 30 to 50 minutes, and most preferably for about 35 minutes. The crabs should remain in the solution for a sufficient time to freeze them, but not so long as to damage or affect the quality of their meaty tissue. Once frozen, the crabs are then removed from the brine solution.

After removal from the brine solution, the crabs may then be packaged and/or stored. It is, however, sometimes advantageous to form a thin coating of ice, or glaze, on the crab. This glazing is common in the preservation of, e.g., shrimp or fish, because both are easily dehydrated, the thin shell of the shrimp providing little protection. The glazing is actually unnecessary in the case of hard-shelled crabs, since the thick crab shell acts as an insulator and serves to prevent dehydration during storage.

If a glaze coating is desired, upon removal from the immersion unit, the crabs are momentarily dipped into cooled water to provide a thin coating of ice. The crabs are typically dipped for a few seconds in a cold water bath maintained at a temperature of from about 30°–33° F., preferably at 32° F.

The end product, whether glazed or not, may be stored for up to about six months and is then packaged for retail sale.

The following Example is provided to illustrate and to enable one of ordinary skill in the art to practice the present invention. This Example is merely illustrative and is not intended to limit the scope of the present invention, which is defined by the appended claims.

EXAMPLE 40 pounds of #1 hard-shelled crabs were washed and chilled in a refrigeration unit to a temperature of 38° F. An elastic band was then placed over each pincer claw and the point of the carapace of each crab to hold them tightly. The crabs were then placed in a mesh basket, similar to a wire net, to hold the crabs and to allow good circulation of brine solution over, around and through the crabs.

1135 liters of brine solution having a specific gravity of 1.12 and a NaCl concentration of 23.5 wt. % were then introduced into an insulated tank having a volume of about 1230 liters. The brine solution also included 400 ppm of Shield Brite Defoamer. The brine solution was maintained at a temperature of about 0° F. The brine solution was maintained under constant agitation by a hydraulic motor driven two blade weedless nylon propeller having a diameter of 6.5 inches. The propeller was immersed in the center of the tank to provide a positive flow in two directions.

The crabs were then immersed in the agitated brine solution for 35 minutes after which they were removed and found to be frozen throughout. When steamed, the crabs had a taste and texture comparable to live steamed crabs. In addition, there was no noticeable deterioration or decomposition of the meaty tissue of the crabs.

COMPARATIVE EXAMPLE

The procedure of the foregoing Example was repeated except the crabs were bulk frozen; i.e., they were packed in a bushel basket having solid panel-type sides and remained in the bath for 45 minutes. Some crabs had an undesirable texture, were mushy, and decomposition and deterioration was observed which left them unfit for market. The bushel basket did not permit complete circulation of the brine solution and, therefore, the crabs could not be properly frozen. The unfit crabs were apparently those making up the inner layers in the packed basket. Thus, to rapidly freeze hard-shelled crabs in accordance with the present invention, complete circulation of the brine solution over, around and through each individual crab is essential.

Although one specific embodiment of the present invention has been described above, it should be understood that this embodiment is described for illustrative purposes only and that numerous alterations and modifications can be practiced by those skilled in the art without departing from the scope of the invention. Accordingly, it is the intent that the present invention not be limited by the above, but be limited only as defined in the appended claims.

What is claimed is:

1. A method of preserving live hard-shell crabs by freezing comprising the steps of:
   (a) washing and chilling at least one live hard-shell crab;
   (b) immobilizing the pincer claws and the carapace of the crab;
   (c) immersing the crab in a brine solution including a chemical defoamer, the solution being maintained at a temperature of from about $-7°$ to $10°$ F., to rapidly freeze the crab;
   (d) constantly agitating the brine solution to provide complete circulation of the brine solution over, around and through the crab;
   (e) removing the frozen crab from solution; and then
   (f) dipping the frozen crab in cold water to form a thin coating of ice thereon.

2. The method of claim 1 wherein the defoamer is a composition comprising dimethylpolysiloxane stearate, xanthan gum and methylparaben.

3. The method of claim 1 wherein the defoamer is a silicone based defoamer.

4. The method of claim 1 wherein the defoamer is a vegetable based defoamer.

5. The method of claim 1 wherein the brine solution has a specific gravity of from about 1.10 to 1.14.

6. The method of claim 1 wherein the cold water of step (f) is maintained at a temperature of from about $30°-33°$ F.

* * * * *